Jan. 9, 1962 T. C. ZINNIGER 3,016,062
ROTARY BALL VALVE
Filed Jan. 3, 1961 2 Sheets-Sheet 1
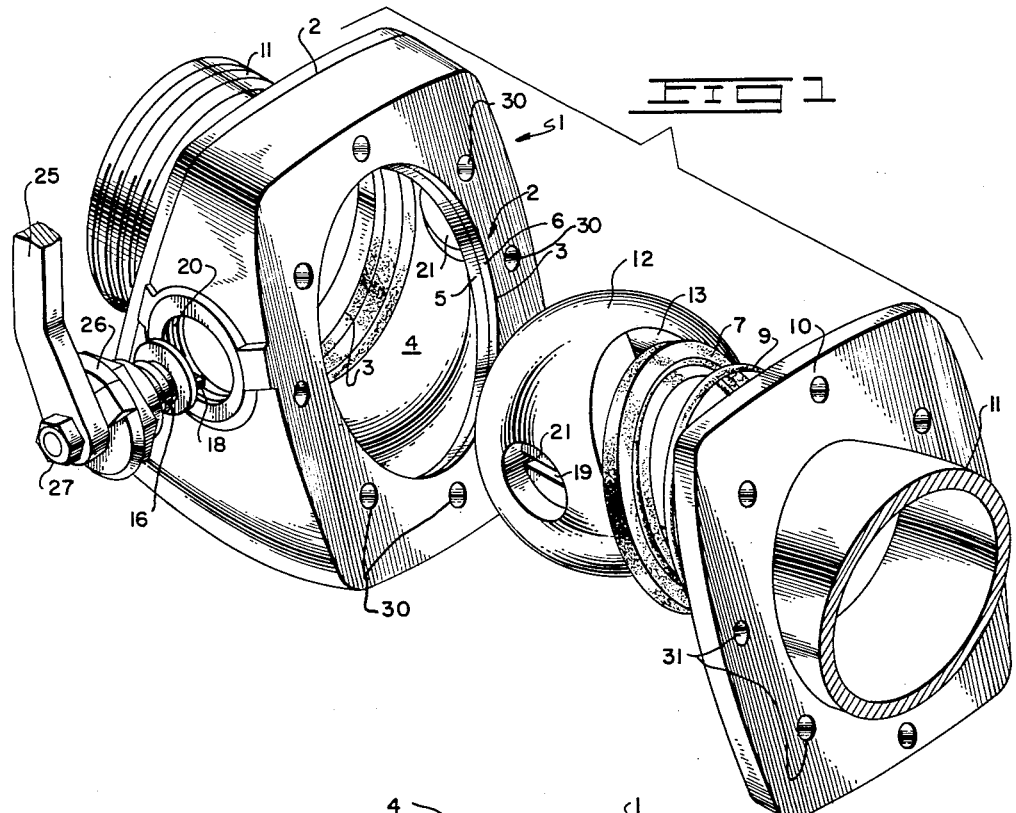
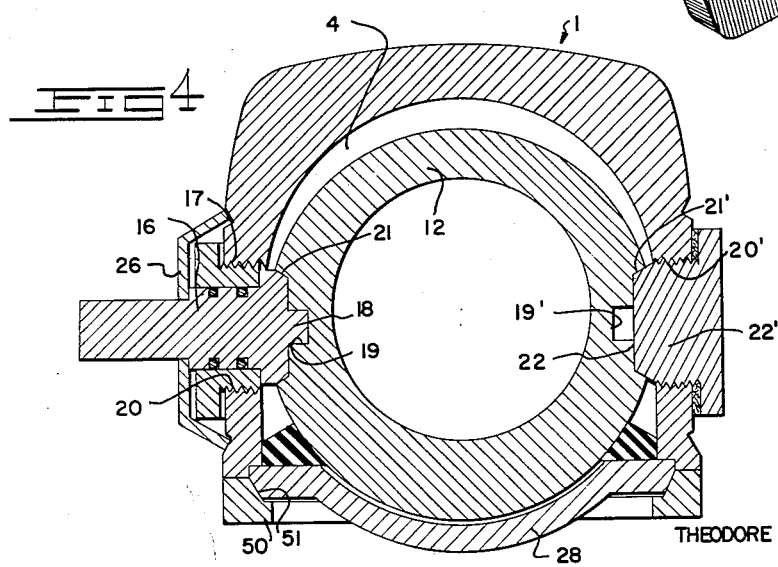
INVENTOR
THEODORE C. ZINNIGER

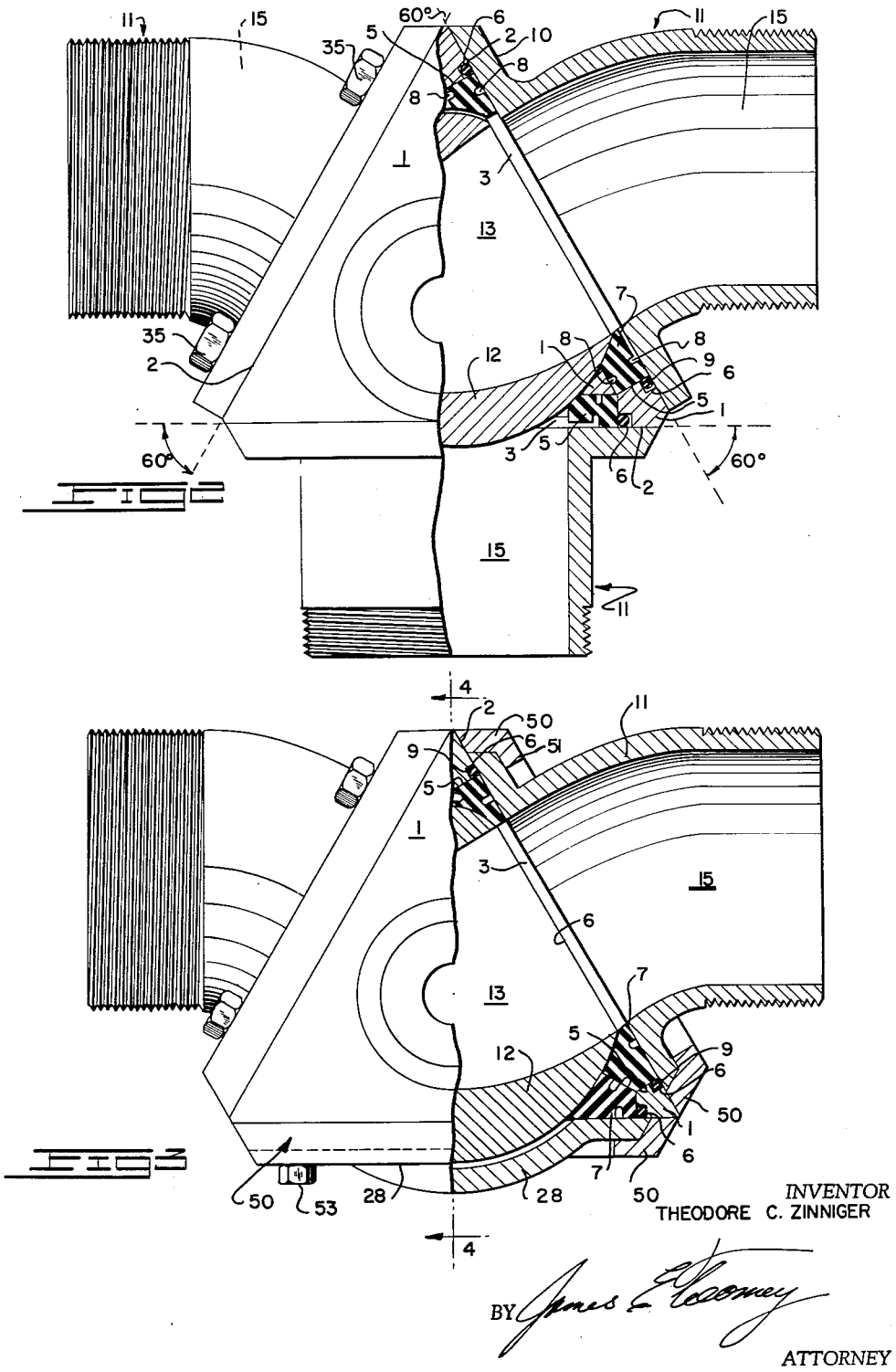

United States Patent Office 3,016,062
Patented Jan. 9, 1962

1

3,016,062
ROTARY BALL VALVE
Theodore C. Zinniger, Hayward, Calif., assignor to Kaiser Industries Corporation, Oakland, Calif., a corporation of Nevada
Filed Jan. 3, 1961, Ser. No. 80,254
11 Claims. (Cl. 137—270)

This invention relates to control valve for fluids, gases, granular material and the like. More particularly, it is concerned with an improved control valve for fluids, gases, granular material and the like wherein conduit fittings can be readily attached to the valve body at varying entrance and exit angles without disturbing the normal functioning of the valve.

The structures of prior art control valves is such that conduit fittings normally attached to the valve bodies could be affixed to the valve bodies at only specific predetermined angles. As a consequence it was difficult to install, repair, replace or clean such control valves. Frequently, existing piping installations had to be modified or removed to accommodate these control valves.

Accordingly, it is a primary purpose of the instant invention to provide a unique and extremely versatile control valve which lends itself to installation in varying environments and can be readily installed even in existing piping installations without seriously disturbing the same and which can be readily replaced, cleaned or repaired.

Other objects and advantages of the instant invention will become more apparent from a review of the following detailed description when taken in conjunction with the appended drawings wherein:

FIGURE 1 is an exploded view of one form of the valve of the instant invention;

FIGURE 2 is a part elevational and part sectional view of a somewhat modified form of valve of the instant invention with parts removed;

FIGURE 3 is a view similar to FIGURE 2 and discloses a further modified form of valve of the instant invention with parts removed; and FIGURE 4 is a sectional view generally taken along the line 4—4 of FIGURE 3.

With further reference to the drawings, and in particular FIGURES 1 and 2 the control valve in one embodiment of the instant invention is generally comprised of a hollow valve body or housing 1. This housing is advantageously wedge or triangularly shaped in one cross-sectional configuration or plane whereby it is provided with a plurality of inclined and exposed faces 2 which converge towards each other in the same plane. Each exposed face 2 is provided with a port or aperture 3 which communicates with the hollow interior 4 of the valve body 1.

Each of the ports 3 on the exposed faces 2 of the housing 1 can be advantageously stepped whereby the port or opening 3 is provided with one or more annular and concentrically disposed recesses or steps 5 and 6. Mounted within the innermost recess 5 is a resilient sealing ring or gasket 7 of suitable rubber or rubber-like material. Sealing ring 7 can be advantageously provided, as indicated in FIGURE 2, with annular recesses or pockets 8 which enhance the resilient and compressible characteristics of the ring. Disposed within recess 6 is a smaller ring or gasket 9 made from a material similar to that of

2 seal 7. Seal 9 is held in place partially by means of ring 7 nad partially by means of the flange 10 of the conduit fitting 11 which is anchored in a manner to be described more fully hereinafter to an exposed face 2 of the valve housing 1.

Rotatably mounted within the hollow interior 4 of the valve housing 1 is a ball-type valve element 12 in which is disposed a through-way aperture or port 13. Upon rotation of valve element 12 the proper number of degrees the through-way port 13 is placed in open communication with the hollow interiors 15 of a pair of conduit fittings 11. Correspondingly rotation of valve element 12 the proper number of degrees will cause a blocking of the one conduit fitting with respect to the other.

The means for rotating the valve element 12 advantageously comprises a stem member 16 mounted in a threaded valve stem bushing 17 located in a threaded opening 20 in one side wall of the housing 1. The inner end of stem 16 terminates in a key 18 lockingly inserted in the notch 19 of the recess 21 in one side wall of the valve element 12. Located on the other side wall of the valve element 12 and directly across from recess 21 is a second recess 21′ provided with a notch 19′. The end 22 of a threaded bearing plug 22′ mounted in opening 20′ on the opposite side wall of the housing 1 is inserted within recess 21′ of valve element 12 and acts as a pivotal support for valve element 12. Also secured to the valve stem 16 is a conventional operating handle 25, washer 26 and a lock nut 27.

By placing a pair of similar apertures 20 and 20′ on opposite sides of the housing 1 the operating handle 25 and valve stem 16 can be interchangeably placed on either side of the housing 1 depending on installation conditions, thereby facilitating installation and operation of the valve element 12.

Although as indicated in FIGURE 1, the valve of the instant invention can be comprised of a body which is generally wedge or triangularly shaped in one plane and provided with only a pair of apertured and exposed faces 2, it is also contemplated, as indicated in FIGURES 2–4, that the valve body 1 while still retaining its generally triangular or wedge shape can be advantageously provided with at least three apertured and exposed faces 2. In other words, the valve of the instant invention can be either a two-way valve or a three-way valve. Moreover, in the event the valve is initially constructed as a three-way valve, a suitable cover and sealing plate 28 can be applied to one of the exposed faces 2 as indicated in FIGURES 3 and 4 when it is desirable to use the valve only as a two-way valve.

As further indicated in FIGURE 4 the seal rings 7 can be of such a shape in cross section and the interior part 4 of the valve body so configurated that the rings 7 themselves abut each other and act in conjunction with the flanges 10 of the conduit fittings 11 to retain each other in position within the valve body 1. Rings 7 and 9 serve a dual function in that they seal the valve element 12 within the valve body and the conduit fittings 11 to the valve body.

In one advantageous embodiment of the invention the exposed faces 2 of valve housing 1 are each provided with a suitable series of threaded external openings or apertures 30 arranged along a common arc or circle. The flanges 10 of the individual conduit fittings which are secured to the exposed faces of the valve housing 1 are correspondingly provided with a series of similar threaded opennigs or apertures 31 located along a common arc or circle which coincides with the arc or circle of openings 30.

The various openings 30 are advantageously located equal distances from each other and the spacing between openings 30 coincides with that of the openings 31 on the flange 10 for each of the conduit fittings. Thus after a fitting 11 has been rotated the requisite number of degrees to get the proper entry or exit angle anchor bolts 35 are thrust through openings 30 and 31 and tightened.

In lieu of using apertures 30 and 31 arranged along common and coinciding arcs on faces 2 and flanges 10 of the conduit fittings and through which bolts 35 are inserted the instant invention further contemplates, as indicated particularly in FIGURES 3 and 4, that collars 50 can be employed for anchoring the fittings 11 and cover elements 28 to the valve housing 1. In this instance as indicated particularly in FIGURE 3 the ring-like collars would be provided with a suitable shoulder element 51 which engages the outside of the flange 10 of a fitting or a cover element as the case may be. When the flange 10 of a fitting 11 is sandwiched in between a collar 50 and the valve body 1 and suitable bolts 53 thrust through openings in the collar and aligned openings in a face 2 and drawn up the collar 50 will securely anchor the conduit fitting to the valve body. In the case of where a collar is used the openings in the collar and the corresponding opening in the face 2 of the valve body are preferably located at predetermined points adjacent the outer perpheries of faces 2 and collars 50 so as not to contact or interfere with the rotation of flanges 10. When collars 50 are used all that has to be done to adjust a fitting 11 to the proper angle is to loosen the bolts 53 until the fitting can be rotated freely. The fitting 11 is then turned to the proper angle and bolts 53 retightened.

The advantages of the aforesaid arrangements are believed obvious. The conduit fittings or elbows 11 can be mounted on the angularly disposed faces of the valve housing 1 in an infinite variety of ways whereby an infinite variety of entrance and exit angles can be employed for the fittings. This feature of adjustability as regards the conduit fittings or elbows 11 is taken further advantage of by virtue of the particular wedge configuration of the housing 1 itself. The particular configuration of the valve body enables it to be inserted readily in various normally inaccessible places in plants and other installations where such valves would be used and almost any type of entrance and exit angle can be accomplished or obtained for any given conduit fittings while using the same valve body. When the valve is used as a three-way valve, the ball element 12 can be rotated so that any two given conduit fittings or elbows are placed in open communication with one another while at the same time the third opening is effectively closed. In other words, the port 13 of the ball element 12 is such that it allows either a three-way selection or a double selection for an on-off valve.

In most instances the valve body structure 1 will find its greatest adaptability for use and its versatility enhanced if the sloping or inclined exposed faces 2 of the valve body are disposed such that they form the base and sides of a triangle wherein each side 2 intersects with an adjacent side approximately at an angle of 60°.

An advantageous embodiment of the invention has been shown and described.

It is obvious that various changes and modifications may be made in the instant invention without departing from the spirit and scope thereof as defined in the appended claims wherein:

What is claimed is:

1. A valve device of the type described comprising the combination of a hollow housing which is generally triangular in one cross-sectional configuration, said housing being provided with exposed faces on a plurality of sides of said housing which converge toward each other in the said cross-sectional configuration; said exposed faces having central openings which communicate with the hollow interior of said housing, an apertured ball element rotatingly mounted in said housing, the aperture of said ball element being simultaneously alignable with the openings of a pair of the exposed faces, hollow conduit fittings rotatably and adjustably affixed at predetermined angles to each face of said pair of exposed faces, resilient gasket means disposed adjacent the opening in each face of the housing for sealing said ball element within said housing and said fittings to said housing, and means for rotating said ball element within said housing so as to align the aperture of the ball element with the openings in the pair of exposed faces of the housing and the interior of the hollow conduit fittings irrespective of the angles at which said conduit fittings are affixed to said housing.

2. A valve device as set forth in claim 1 wherein the faces of the housing are each provided with a series of apertures arranged along a common arc and corresponding series of apertures arranged on the flanges of the conduit fittings and alignable with the apertures on the faces of the housing and anchor means insertable within certain of the apertures on the housing and the flanges of the conduit fittings after the fittings have been rotated in predetermined directions and to preselected positions on said housing and the apertures of the fittings and housing are aligned.

3. A device as set forth in claim 1 wherein the gasket means comprises a plurality of annular seal rings concentrically arranged about each central aperture on the exposed faces of the housing.

4. The combination as set forth in claim 1 wherein the gasket means on adjacent faces abut each other.

5. The combination as set forth in claim 1 wherein one exposed face of the valve housing is provided with a sealing cap means for closing the central opening in one of the exposed faces of the housing.

6. The combination as set forth in claim 3 wherein one of said rings is provided with at least one annular groove therein.

7. In a ball type valve the combination of a hollow valve body provided with a plurality of exposed faces disposed at angles with respect to one another so as to form a valve body of generally wedge shape configuration in one cross-sectional plane, certain of said faces also having openings which communicate with the hollow interior of said body, an apertured ball element rotatably mounted within said body, hollow conduit fittings adjustably and rotatably secured to at least a pair of faces on said body adjacent the openings therein, means for rotating said ball element within said valve body and for selectively placing said conduit fittings in and out of communication with the interior of the valve body and with each other, seal means for sealing said ball element wtihin said body and the fittings to said body and means for securing a fitting to a face of said body after the fitting has been rotated to a preselectioned angle on the face of said body.

8. In a ball-type valve as set forth in claim 7 wherein the seal means comprises a plurality of concentrically arranged seal rings of resilient material disposed in concentrically arranged recesses surrounding the openings in the faces of the valve body.

9. In a ball-type valve as set forth in claim 7 wherein the means for securing a fitting to a face of the valve body comprise a series of apertures arranged along a common arc on the said face and a corresponding series of apertures on the fitting which mate with the apertures on the face of the valve body associated therewith and bolt means insertable in selected mating apertures in a conduit fitting and an exposed face of the valve body.

10. The combination as set forth in claim 7 wherein the means for securing a fitting to a face of the valve body includes a collar engageable with the outside of the fitting and means for removably securing the collar to the face of the valve body associated therewith.

11. The combination as set forth in claim 7 wherein one exposed face of the valve body is provided with a sealing cap means for closing off the opening in the one exposed face.

References Cited in the file of this patent

UNITED STATES PATENTS

| | | |
|---|---|---|
| 1,807,085 | Crickmer | May 26, 1931 |
| 2,301,976 | Schellens | Nov. 17, 1942 |
| 2,963,263 | Sanctuary | Dec. 6, 1960 |

FOREIGN PATENTS

| | | |
|---|---|---|
| 669,020 | France | July 27, 1929 |